United States Patent
Kohl et al.

(10) Patent No.: US 8,133,634 B2
(45) Date of Patent: Mar. 13, 2012

(54) FUEL CELL WITH POROUS FRIT BASED COMPOSITE PROTON EXCHANGE MEMBRANE

(75) Inventors: Paul A. Kohl, Atlanta, GA (US); Jun Li, Mansfield, MA (US)

(73) Assignee: Georgia Tech Research Corporation, Atlanta, GA (US)

( * ) Notice: Subject to any disclaimer, the term of this patent is extended or adjusted under 35 U.S.C. 154(b) by 526 days.

(21) Appl. No.: 12/093,277

(22) PCT Filed: Dec. 11, 2006

(86) PCT No.: PCT/US2006/046962
§ 371 (c)(1),
(2), (4) Date: Dec. 23, 2008

(87) PCT Pub. No.: WO2007/070399
PCT Pub. Date: Jun. 21, 2007

(65) Prior Publication Data
US 2009/0297908 A1 Dec. 3, 2009

(51) Int. Cl.
*H01M 8/10* (2006.01)
(52) U.S. Cl. ........ 429/492; 429/493; 429/494; 429/516; 429/535; 29/623.5
(58) Field of Classification Search .......... 429/535, 429/492, 493, 494, 516; 29/623.5
See application file for complete search history.

(56) References Cited

U.S. PATENT DOCUMENTS

| | | | |
|---|---|---|---|
| 6,416,898 B1 | 7/2002 | Ohzu et al. | |
| 6,492,047 B1 | 12/2002 | Peled et al. | |
| 6,811,905 B1 | 11/2004 | Cropley | |
| 7,875,404 B2 * | 1/2011 | Moore et al. | 429/483 |
| 2003/0087141 A1 | 5/2003 | Sun et al. | |
| 2004/0241520 A1 * | 12/2004 | Ha et al. | 429/33 |
| 2006/0194098 A1 * | 8/2006 | Chang et al. | 429/127 |
| 2007/0020499 A1 * | 1/2007 | Suzuki et al. | 429/33 |
| 2008/0050637 A1 * | 2/2008 | Prakash et al. | 429/34 |
| 2009/0104479 A1 * | 4/2009 | Kohl et al. | 429/13 |

FOREIGN PATENT DOCUMENTS

| | | |
|---|---|---|
| WO | 99/60649 A | 11/1999 |
| WO | 03-069708 A | 8/2003 |
| WO | 2005-079466 A | 9/2005 |

OTHER PUBLICATIONS

European Search Report in co-pending related EP Application No. EP 06848591, mailed Sep. 14, 2009.
PCT Search Report in co-pending related PCT Application No. PCT/US2006/046962, mailed Mar. 5, 2009.

* cited by examiner

*Primary Examiner* — Helene Klemanski
(74) *Attorney, Agent, or Firm* — Thomas, Kayden, Horstemeyer & Risley, LLP

(57) ABSTRACT

A fuel cell includes a porous frit based composite proton exchange membrane. The pores of the porous frit are filled with a proton-conducting material.

24 Claims, 5 Drawing Sheets

# FUEL CELL WITH POROUS FRIT BASED COMPOSITE PROTON EXCHANGE MEMBRANE

TECHNICAL FIELD

The present disclosure relates generally to the field of fuel cells. More specifically, the present disclosure relates to methanol fuel cells with a porous proton-exchange membrane.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in drawings, the drawings are not necessarily drawn to scale unless specifically indicated.

As those of skill in the art will appreciate, the principles of the invention may be applied to and used with a variety of fuel cell systems including an inorganic or organic fuel cell, direct methanol fuel cell (DMFC), reformed methanol fuel cell, direct ethanol fuel cell, proton-exchange membrane (PEM) fuel cell, microbial fuel cell, reversible fuel cell, formic acid fuel cell, and the like. Furthermore, the present invention may be used in a variety of applications and with fuel cells of various sizes and shapes. For purposes of example only, and not meant as a limitation, the present invention may be used for electronic battery replacement, mini and microelectronics, car engines, power plants, and an as an energy source in many other devices and applications.

Figure 1:
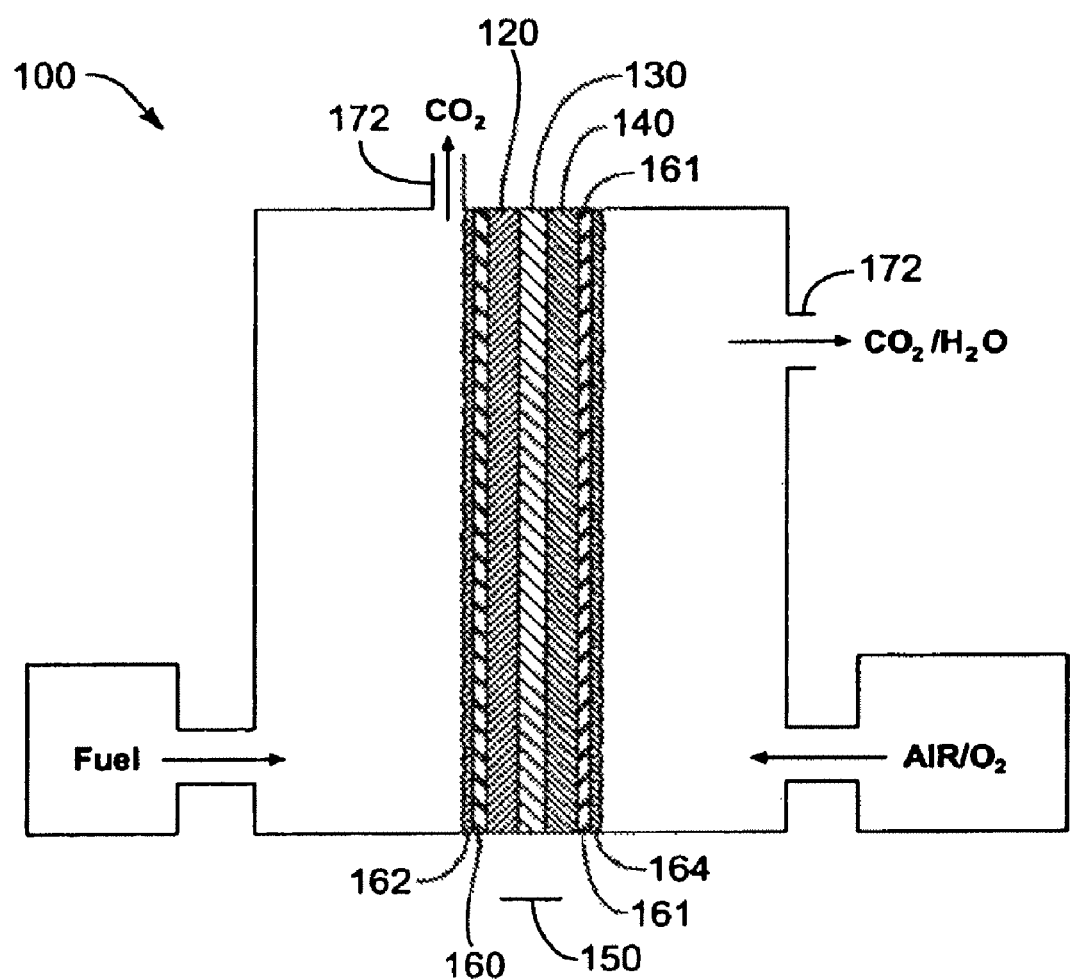
FIG. 1 is a schematic of a possible example of a fuel cell.

With reference now to the accompanying figures, particular embodiments will now be described in greater detail. Referring to FIG. 1, a fuel cell 100 may include an anode side 120 and cathode side 140 separated by a proton-conducting membrane, or electrolyte. The anode side 120 may be disposed on one side of the composite PEM 130 and the cathode side 140 disposed on the opposite side of the PEM 130.

In the fuel cell 100, a fuel is oxidized in the presence of a catalysis (Pt—Ru) and water ($H_2O$) on the anode side 120 to produce electrons ($e^-$), protons ($H^+$), and carbon dioxide ($CO_2$). The electrons are forced to flow from the anode side 120 to the cathode side 140 through an external circuit 150 to deliver electrical energy to an attached electrical device (not shown). Meanwhile, the protons pass through the composite PEM 130 and combine with oxygen ($O_2$) and the electrons coming back from the external circuit to form water on the cathode side 140.

One example of a fuel cell 100 is a direct organic fuel cells which may use hydrocarbon fuels such as diesel, methanol, ethanol, and chemical hydrides. For purposes of example only and not as a limitation, one embodiment of the present invention may include a Direct-methanol fuel cell (DMFC) which is a subcategory of proton-exchange fuel cells where, the fuel, methanol, is fed directly to the fuel cell. The anode side 120 and cathode side 140 reactions in a DMFC can be expressed as follows:

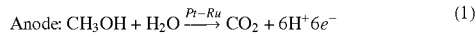

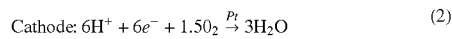

For a direct methanol fuel cell, a high methanol concentration is desired in order to increase electrical production. However, in traditional DMFCs, the use of a high concentration of methanol fuel results in a serious crossover of fuel through the proton-conductive membrane when a solid proton-conductive membrane is used. One type of commercially available solid proton-conductive membrane is available under the registered trademark Nafion from DuPont Chemical Co., Delaware. The fuel crossover decreases not only the DMFC efficiency but also the voltage efficiency because it poisons the cathode and lowers cathode performance. Another problem when using a solid Nafion membrane fuel cell is the electromigration of water from the anode side to the cathode side which complicates water management in the fuel cell and limits the methanol fuel concentration.

With continued reference to FIG. 1, to overcome the fuel cross over and water cross over common when using a solid proton-conducting membrane, a composite porous proton-exchange membrane 130 (hereinafter "composite PEM 130") may be used in the fuel cell 100.

The composite PEM 130 may be composed of a porous frit. A porous frit as used herein includes a finely porous material through which gas or liquid may pass such as a sintered glass or sintered ceramic. The porous frit of the composite PEM 130 may be filled with one or more proton-conducting materials such as the perfluorinated sulfonic acid polymer commercially available under the registered trademark Nafion from DuPont Chemical Co., Delaware. The porous frit may be filled by other proton-conducting materials and polymers such as poly para-phenylene sulphonic acid (PPSA), polyvinylidenefluoride (PVDF), and others. The pores of the composite PEM 130 may be filled by soaking with the proton-conducting material in a solvent solution and then dried; thus, leaving the proton conducting material behind in the porous frit. Once dried, the surfaces of the composite PEM 130 can be scraped and smoothed with a culling or polishing tool to clean off the unabsorbed material. The number and volume of the pores in the composite PEM 130 may be adjusted and optimized for the desired photon-conductivity and crossover.

With continued reference to FIG. 1, the anode side 120 and the cathode side 140 may include a catalyst layer such as a metal catalyst including fine Platinum (Pt). Palladium (Pd), and Ruthenium (Ru) particles. For example, the anode-catalyst 160 may be applied directly to the composite PEM 130 by brush coating a metal catalyst such as a Platinum-ruthenium mixture to the anode side 120 of the composite PEM 130. A current collector 162, such as a porous gold coating, may also be applied to the anode-catalyst 160. Likewise, the cathode-catalyst 161, such as an air-breathing cathode catalyst, may be applied to the cathode side 140 by brushing or rolling on a metal catalyst layer such as a Platinum layer over the cathode side 140. A current collector 164, such as a porous gold coating, may then be applied to the surface of the cathode-catalyst 161. The current collector 162 and the current collector 164 may be connected to the external circuit 150.

Alternatively, the anode-catalyst 160 and the cathode-catalyst 161 may be applied to the composite PEM 130 by chemical vapor deposition techniques known by those of skill in the arts. Furthermore, the current collector 162 and the current collector 164 may be applied by chemical vapor deposition techniques.

In another embodiment, the fuel cell 100 may include a $CO_2$ vent 170 which allows passage of any $CO_2$ gas generated by the fuel cell 100. The $CO_2$ vent may be composed of a hydrophobic material such as poly dimethyl siloxane to selectively allow the $CO_2$ to escape. The fuel cell 100 may include a exit port 172 allowing for the exit of $H_2O$ and $CO_2$ from the cathode side 140.

In yet another embodiment shown by FIG. 2, a membrane electrode assembly 200 (hereinafter "MEA 200") may be formed by starting with a porous frit 210. The pores of the porous frit 210 may be filled with one or more proton-conducting materials such as the perfluorinated sulfonic acid polymer commercially available under the registered trademark Nafion from DuPont Chemical Co., Delaware. The porous frit 210 may be filled by other proton-conducting materials and polymers such as poly para-phenylene sulphonic acid (PPSA), polyvinylidenefluoride (PVDF), and others as desired. Once the pores of the porous frit 210 are filled a composite proton-conducting membrane 230 (hereinafter "composite PEM 230") is formed.

Figure 2:
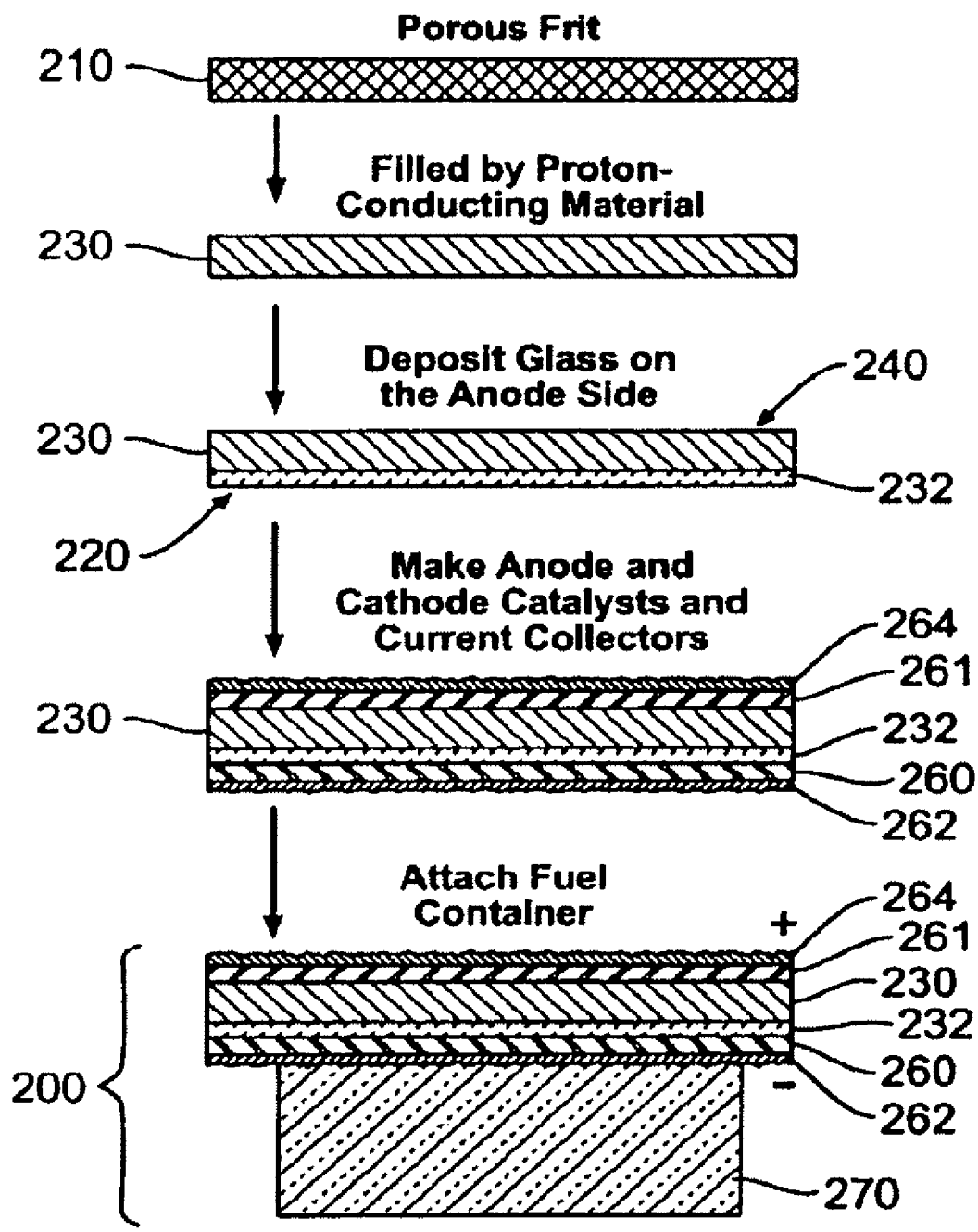
FIG. 2 is a flow chart illustrating a method of making a possible embodiment of a porous proton-exchange membrane.

With continued reference to FIG. 2, embodiments of the composite PEM 230 may be coated with a layer of glass 232 on the anode side 220. The layer of glass 232 may be deposited by chemical vapor deposition techniques. For example, the layer of glass 232 may be deposited by placing the composite PEM 230 in a plasma enhanced chemical vapor deposition chamber containing $SiH_4+PH_3$ gas or other gasses to form silicate glass on the anode side 220 of the composite PEM 230. The composition and formulation of the layer of glass 232 may be adjusted as desired to control conductivity and mechanical toughness of the glass layer 232 as well as to control resistance to fuel and/or water crossover.

After the layer of glass 232 has been deposited on the composite PEM 230, the anode-catalyst 260 may be deposited on the glass layer 232 and the cathode-catalyst 261 may be deposited on the cathode side 240 opposite the anode side 220. Both the anode-catalyst 260 and the cathode-catalyst 261 may be one or more metal catalysts such as Pt or a Pt—Ru mixture. The current collectors 262 and 264 may comprise a porous gold coating or other conductive coating and can be deposited over the anode-catalyst 260 and the cathode-catalyst 261, respectively.

Once the anode-catalyst 260, the cathode-catalyst 261 and the current collectors 262 and 264 have been deposited the fuel container 270 may be added to the anode side 220 in order to complete the MEA 200. For purposes of example only and not limitation, an appropriate fuel may include an organic fuel such as a hydrocarbon fuel. For example, liquid methanol may be a fuel used in a fuel cell according to the present invention. More particularly, the concentration of the methanol may be approximately 1M, 2M, 3M, 4M, 5M, 6M, 7M, 8M, 9M, 10M, 11M, 12M or 13M. The methanol fuel may be diluted by water to the desires concentration.

Figure 8:
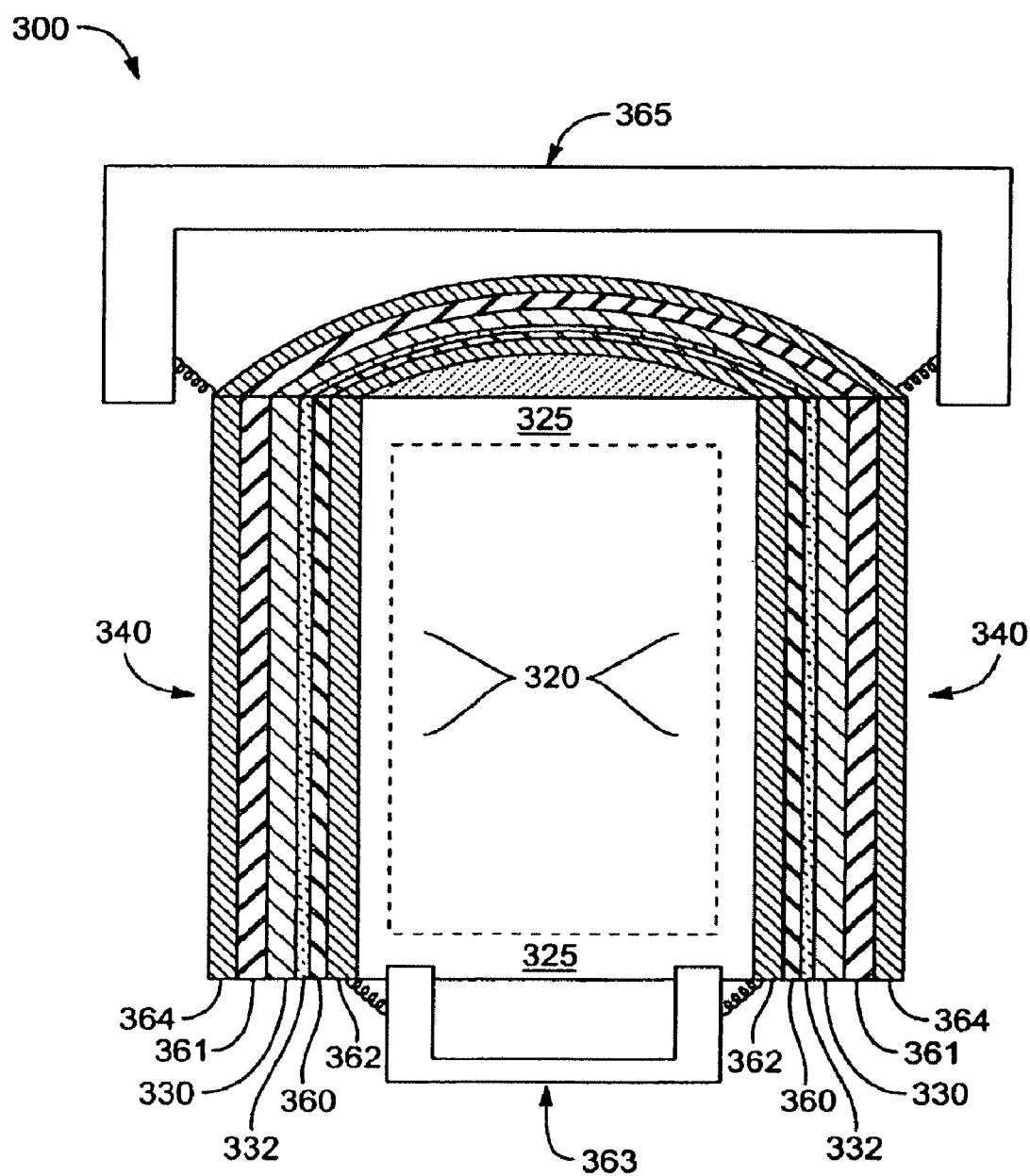
FIG. 8 is a cross sectional view of another embodiment of a fuel cell battery with a composite proton-exchange membrane.

In still yet another embodiment, a fuel cell according to the present invention may be configured to resemble a battery 300 such as a D, C, B, A, AA, or other desired size batteries commonly used in consumer electronics. Referring to FIG. 8, a porous frit may formed and configured to accommodate the desired battery size such as a cylindrical porous frit. For purposes of example only and not meant as a limitation, FIG. 8 shows the use of a cylindrical porous frit. As described previously, the pores of the cylindrical porous frit may be filled with one or more proton-conducting materials such as the perfluorinated sulfonic acid polymer commercially available under the registered trademark Nafion (from DuPont Chemical Co., Delaware) or by other proton-conducting materials and polymers such as poly para-phenylene sulphonic acid (PPSA), polyvinylidenefluoride (PVDF), and others as desired. Once the pores of the cylindrical porous frit are filled, a cylindrical composite proton-conducting membrane 330 (hereinafter "cylindrical PEM 330") may be formed.

With continued reference to FIG. 8, embodiments of the cylindrical PEM 330 may be coated with a cylindrical layer of glass 332 on the anode side 320 on the inside of the cylindrical PEM 330. The layer of glass 332 may be deposited by chemical vapor deposition techniques as discussed previously and as known by those of skill in the art.

An anode-catalyst 360 may be deposited on the glass layer 332 and a cathode-catalyst 361 may be deposited on the cathode side 340 which may be on the outside surface of the cylindrical PEM 330. Both the anode-catalyst 360 and the cathode-catalyst 361 may be one or more metal catalysts such as Pt or a Pt—Ru mixture. Over the anode-catalyst 360 and the cathode-catalyst 361 current collectors 362 and 364, respectively, may be deposited. The anode-catalyst 360 and the cathode-catalyst 361 may include a porous gold coating or other conductive coating. The anode side 320 may also include an absorbent liner 325, such as a fabric like cotton, to provide uniform wetting of the anode side 320 by a fuel. In this way, the battery 300 would be operable in any orientation.

The current collector 362 deposited over the anode-catalyst 360 can be connected to an external electrical contact such as a metal cap 363 of the battery 300. Likewise, the current collector 364 deposited over the cathode-catalyst 361 may be connected to an external electrical contact such as a metal cap 365 of the battery 300. Methyl cap 363 and metal cap 365 may be electrically insulated from each other. In this way, an electric current may be completed outside of the battery 300 by connecting the external metal caps 363 and 365 the battery 300. This electric current may be used to power an electronic device.

Example Fuel Cells:

Porous frits approximately 0.2 mm-2 mm thick and approximately 30 mm in diameter, with different pore sizes (approximately 0.9-10 gm) were used as the backbone for various composite proton-exchange membranes. After treatment by an adhesion promoter, the pores in the porous frits were filled by a mixture of Nafion solution (containing less than 10% perfluorosulfonic acid/PTFE copolymer resin; manufactured by DuPont Chemical Co., Delaware) and diethylene glycol (99% from ALDRICH) in ratio of 5:1 under vacuum conditions. The filled porous frits were then baked at 85° C. until a brown color was observed. In this way, the porous frit may become a composite proton-exchange membrane. The porous frits can also be filled with PPSA (poly para-phenylene sulphonic acid), PVDF (Poly(vinylidene-fluoride)), or other proton conductive materials. The anode side of the filled frit was then polished and a 6 gm layer of phosphorus doped silicon dioxide glass (PSG) was deposited on the anode side surface using a Plasma-Therm PECVD system (Plasma-Therm, St. Petersburg, Fla.) at temperatures of 100° C. The reactant gases for silicon dioxide were silane and nitrous oxide with a $N_2O:SiH_4$ ratio of 2.25 and operating pressure of 600 mTorr. The reactant gases for PSG were nitrous oxide and a silane/phosphine mixture made by substituting a gas mixture of 0.3% phosphine and 5.0% silane in helium carrier gas for the standard silane gas (5.0% SiH4 in He). The phosphorus content in the PSG was 0.5-0.6 at. %. The glass thickness was measured with an Alpha-Step surface profilometer (KLA-Tencor, San Jose, Calif.).

The cathode catalyst was made by painting a prepared catalyst ink containing carbon-supported Pt (from E-TEK, Somerset, N.J.) in Nafion on the composite PEM, followed by coating with a porous gold current collector. The cathode catalyst loading was 1 mg/cm$^2$. Atmospheric oxygen was used as the oxidant at the cathode. The anode catalyst was a platinum-ruthenium alloy layer sputter deposited on the PSG surface using either a CVC DC sputterer (CVC Products, Inc., Rochester, N.Y.) or applied a carbon-supported Pt—Ru (from E-TEK, Somerset, N.J.) catalyst ink on the PSG surface, followed by coating with a porous gold current collector. The anode catalyst loading was 30 µg/cm$^2$-1mg/cm$^2$. A fuel container was attached on the anode side and 8M-12M aqueous methanol solution was used as fuel. FIG. 2 shows the process sequence that may be used for fabricating the composite PEM, MEA, and fuel cell.

All electrochemical measurements, including impedance spectroscopy (IS) and linear voltamagrams, were performed with a PerkinElmer PARSTAT 2263 (EG&G, Princeton, N.J.) electrochemical system at room temperature. The scan rate for linear sweep voltametry was 1 mV/s. The frequency range for the impedance measurement was from 1 Hz to 1.25 MHz, with an AC signal amplitude of 10 mV.

Results

Figure 3:
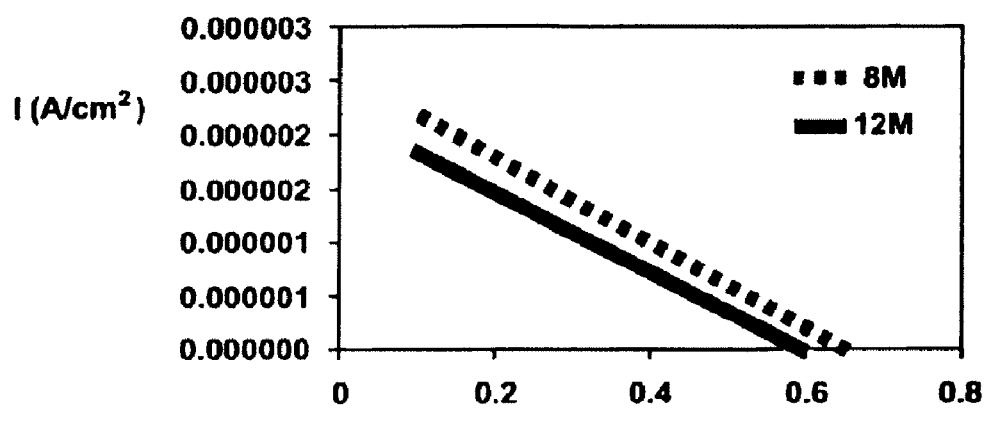
FIG. 3 is a graph comparing the performance of various embodiments of fuel cells using different fuel concentrations.

FIG. 3 shows a graft of the relative performance of two fuel cells both using a Nafion filled porous frit composite PEM. However, each fuel cell used a different concentration of a methanol solution as fuel. The fuel cells were operated at room temperature and atmospheric oxygen was use as the oxidant. The frit thickness was 2 mm and pore size was 0.9-1.4 µm. It can be seen that the cell had a high open circuit potential about 0.6 V. The performance of the cell with 12.0 M methanol solution as fuel was slightly lower than that with 8.0 M methanol fuel. These results indicates that the frit based composite membrane can effectively prevent the methanol permeation.

Figure 4:
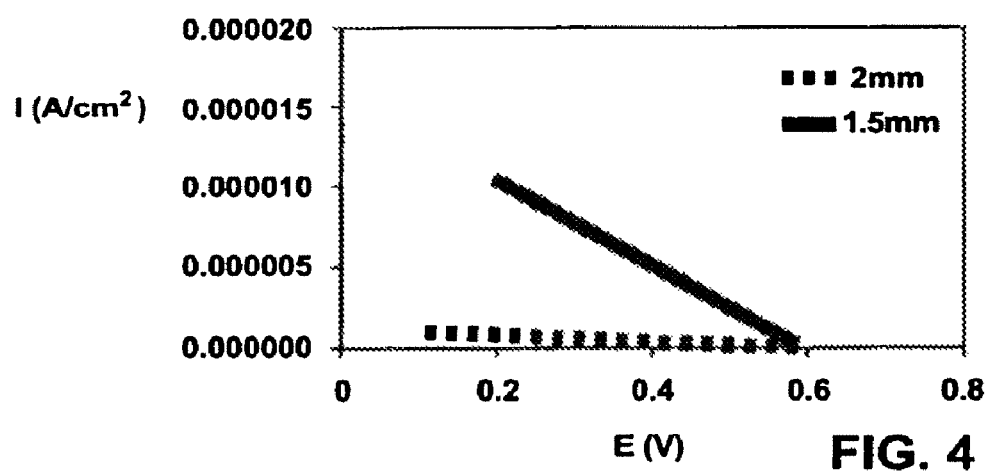
FIG. 4 is a graph showing the relative performance of different embodiments of fuel cells with different thicknesses of porous proton-exchange membranes.

FIG. 4 shows the relative performance of two fuel cells using a Nafion filled frit composite PEM with different porous frit thickness. The frit pore size ranged from 0.9-1.4 gm. The cells were operated at room temperature. The 12.0 M methanol solution was used as fuel and atmospheric oxygen as the oxidant. Because the membrane resistance for proton transportation decreases with the decreased frit thickness, the performance of the micro fuel cell was increased significantly when frit thickness decreased from 2 mm to 1.5 mm.

Figure 5:
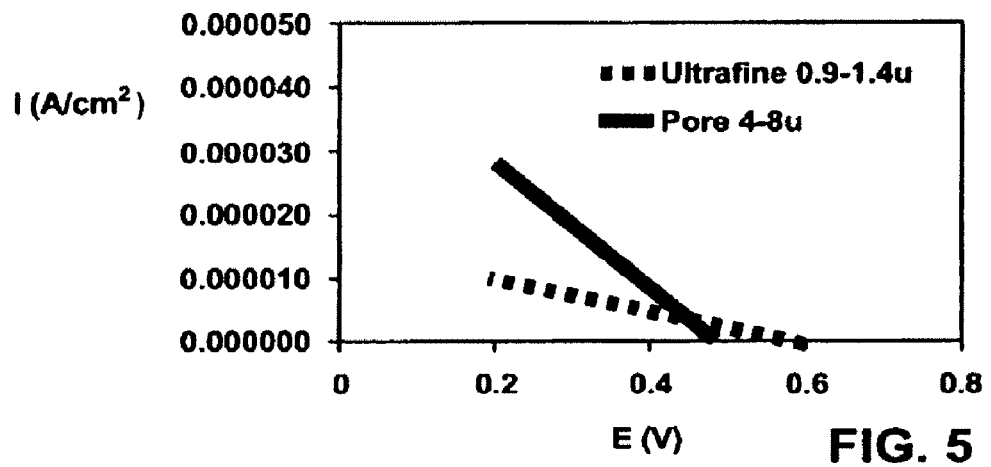
FIG. 5 is a graph showing the relative performance of different embodiments of fuel cells with porous proton-exchange membranes with different pore sizes.

FIG. 5 shows the performance of two fuel cells each using a Nafion filled frit composite membrane but with different frit pore sizes. The frit thickness was 1.5 mm. The cells were operated at room temperature. The 12.0 M methanol solution was used as fuel and atmospheric oxygen as the oxidant. With the increased frit pore sizes, the open circuit potential of the cell decreased and the current density increased. As the fraction of Nafion in the composite membrane increased with the increased pore size, the methanol permeation through membrane also increased.

Figure 6:
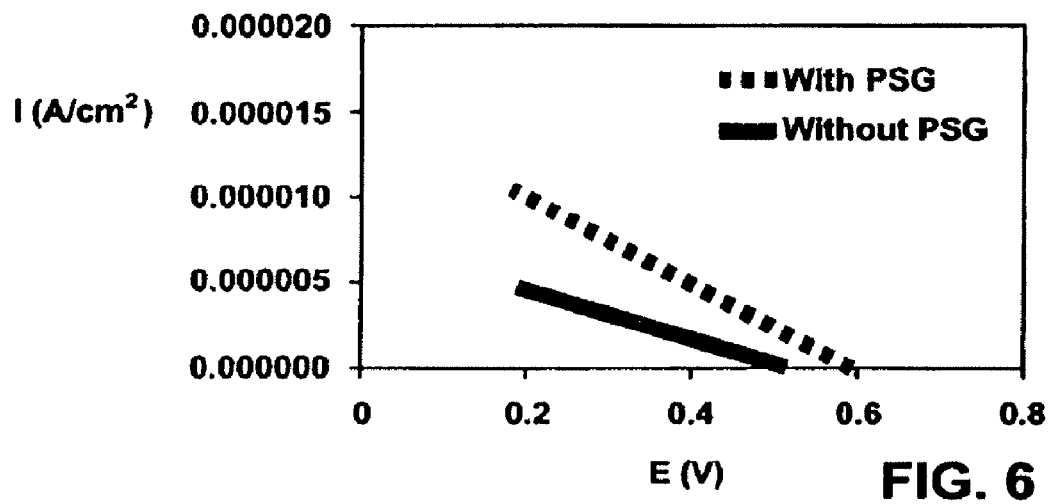
FIG. 6 is a graph showing the performance of various embodiments of fuel cells with porous proton-exchange membranes with and without glass membrane layer.

FIG. 6 graphs the performance of two fuel cells each using a Nafion filled frit composite membrane but one with glass and the other without glass. The frit thickness was 1.5 mm and pore size was 0.9-1.4 µm. The cells were operated at room temperature. The 12.0 M methanol solution was used as fuel and atmospheric oxygen as the oxidant. Both open circuit potential and current density of the cell with glass membrane were higher than that without glass membrane. The results show that the glass membrane helps to prevent methanol permeation through the composite PEM.

Figure 7:
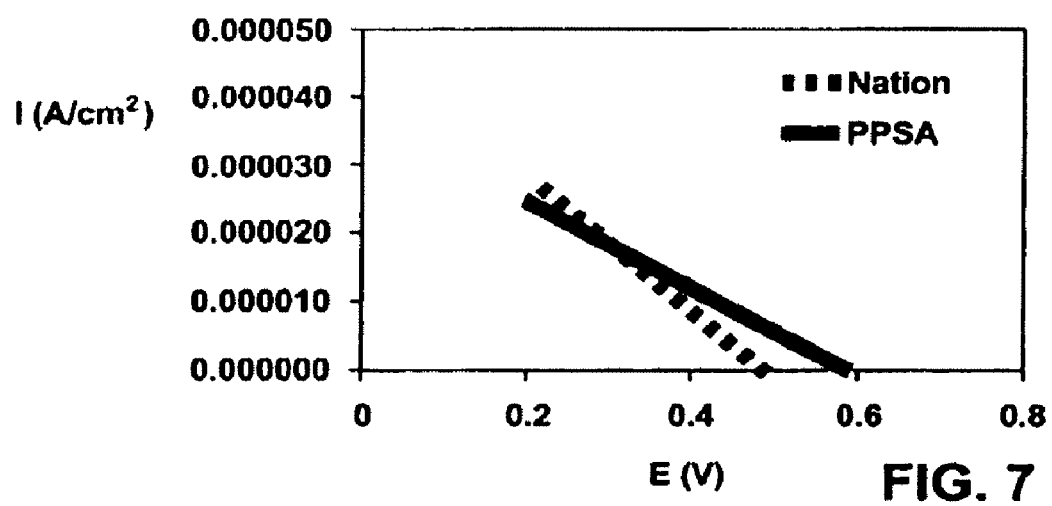
FIG. 7 is a graph showing the performance of multiple embodiments of fuel cells including porous proton-exchange membranes filled with either Nafion or poly para-phenylene sulphonic acid (PPSA).

The frit can be filled by different inorganic or organic proton conductive materials. FIG. 7 shows the relative performance of two fuel cells, one using a Nafion filled frit and the other using a PPSA filled frit. The frit thickness was 1.5 mm and pore size was 4-8 µm. The cells were operated at room temperature. The 12.0 M methanol solution was used as fuel and atmospheric oxygen as the oxidant. It can be seen that the cell with PPSA filled frit composite membrane has a higher open circuit potential than the cell with Nafion filled frit composite membrane.

It will be obvious to those having skill in the art that many changes may be made to the details of the above-described embodiments without departing from the underlying principles of the invention. The scope of the present invention should, therefore, be determined only by the following claims.

The invention claimed is:

1. A fuel cell comprising:
   a proton-exchange membrane comprising a porous frit, wherein the pores of the porous frit are filled with a proton-conducting material, wherein the pores of the porous frit are about 0.9 to 10 micrometers,
   the proton-exchange membrane further comprises an anode side and a cathode side, wherein the anode side comprises an anode catalyst and an anode current collector, and wherein the cathode side comprises a cathode catalyst and a cathode current collector.

2. The fuel cell of claim 1, further comprising an organic fuel.

3. The fuel cell of claim 2, wherein the organic fuel is a hydrocarbon.

4. The fuel cell of claim 3, wherein the hydrocarbon is methanol.

5. The fuel cell of claim 4, wherein the concentration of the methanol is approximately 1 M, 2 M, 3 M, 4 M, 5 M, 6 M, 7 M, 8 M, 9 M, 10M, 11M, 12M or 13M.

6. The fuel cell of claim 4, wherein the methanol is diluted with water.

7. The fuel cell of claim 1, wherein the proton-conducting material comprises a perfluorinated sulfonic acid polymer, poly para-phenylene sui phonic acid (PPSA), polyvinylidene-fluoride (PVDF) or mixtures thereof.

8. The fuel cell of claim 1, wherein the anode catalyst and the cathode catalyst comprise one or more metal catalysts.

9. The fuel cell of claim 1, wherein the anode catalyst and the cathode catalyst comprise Pt, Pd, Ru or mixtures thereof.

10. The fuel cell of claim 1, wherein the anode current collector and the cathode current collector comprise a porous gold layer.

11. A membrane electrode assembly comprising:
a proton-exchange membrane comprising a porous frit with an anode electrode side and a cathode electrode side opposite the anode electrode side;
wherein the pores of the porous frit are filled with a protonconducting material;
wherein the anode electrode side comprises an anode catalyst and a anode current conductor and a glass layer; and
wherein the cathode electrode side comprises a cathode catalyst and a cathode current conductor.

12. The membrane electrode assembly of claim 11, wherein the proton-conducting material comprises a perfluorinated sulfonic acid polymer, poly para-phenylene suiphonic acid (PPSA), polyvinylidenefluoride (PVDF) or mixtures thereof.

13. The membrane electrode assembly of claim 11, wherein the anode electrode catalyst and the cathode electrode catalyst comprise one or more metal catalysts.

14. The membrane electrode assembly of claim 11, wherein the anode electrode catalyst and the cathode electrode catalyst comprise Pt, Pd, Ru or mixtures thereof.

15. A method of making a membrane electrode assembly comprising:
forming a porous frit;
filling the pores of the porous frit with a proton-conducting material wherein the pores of the porous frit are about 0.9 to 10 micrometers;
depositing an anode catalyst on one side of the filled porous frit;
depositing a cathode catalyst on one side of the filled porous frit opposite the anode catalyst;
depositing a current collector on the anode catalyst; and
depositing a current collector on the cathode catalyst.

16. A cylindrical direct methanol fuel cell comprising:
a cylindrical porous frit, wherein the pores of the cylindrical porous frit are filled with a proton-conducting material;
a glass layer deposited on the inside of the cylindrical porous frit;
an anode catalyst deposited on the glass layer;
a cathode catalyst deposited on the outside of the filled cylindrical porous frit;
an anode current collector deposited on the anode catalyst, wherein the anode current collector is electrically connected to an external electric contact;
a cathode current collector deposited on the cathode catalyst, wherein the cathode current collector is electrically connected to an external electric contact; and
liquid methanol disposed within the inside of the filled cylindrical porous frit and in contact with the anode catalyst.

17. The fuel cell of claim 1, wherein the pores of the porous frit are about 0.9 to 1.4 micrometers.

18. The fuel cell of claim 17, wherein the frit thickness is about 1.5 mm.

19. The fuel cell of claim 1, wherein the pores of the porous frit are about 4.8 to 8 micrometers.

20. The fuel cell of claim 19, wherein the frit thickness is about 1.5 mm.

21. The membrane electrode assembly of claim 11, wherein the pores of the porous frit are about 0.9 to 10 micrometers.

22. The membrane electrode assembly of claim 21, wherein the frit thickness is about 1.5 mm.

23. The cylindrical direct methanol fuel cell of claim 16, wherein the pores of the porous frit are about 0.9 to 10 micrometers.

24. The cylindrical direct methanol fuel cell of claim 23, wherein the frit thickness is about 1.5 mm.

* * * * *